(12) United States Patent
Nelson

(10) Patent No.: US 10,132,087 B2
(45) Date of Patent: Nov. 20, 2018

(54) PANEL SYSTEMS AND METHODS

(71) Applicant: Cameron David Nelson, Cronulla (AU)

(72) Inventor: Cameron David Nelson, Cronulla (AU)

( * ) Notice: Subject to any disclaimer, the term of this patent is extended or adjusted under 35 U.S.C. 154(b) by 0 days.

(21) Appl. No.: 15/309,371

(22) PCT Filed: May 8, 2015

(86) PCT No.: PCT/AU2015/050225
§ 371 (c)(1),
(2) Date: Nov. 7, 2016

(87) PCT Pub. No.: WO2015/168745
PCT Pub. Date: Nov. 12, 2015

(65) Prior Publication Data
US 2017/0073976 A1 Mar. 16, 2017

(30) Foreign Application Priority Data
May 9, 2014 (AU) .................. 2014901723

(51) Int. Cl.
E04F 13/15 (2006.01)
E04F 13/08 (2006.01)
E04F 13/18 (2006.01)
G10K 11/168 (2006.01)
(Continued)

(52) U.S. Cl.
CPC ...... E04F 13/0894 (2013.01); E04F 13/0803 (2013.01); E04F 13/0825 (2013.01); E04F 13/0866 (2013.01); E04F 13/0867 (2013.01); E04F 13/0875 (2013.01); E04F 13/15 (2013.01); E04F 13/18 (2013.01); E04F 15/206 (2013.01); G10K 11/168 (2013.01); B32B 2607/00 (2013.01); E04C 2/284 (2013.01);
(Continued)

(58) Field of Classification Search
CPC .............. E04F 13/0894; E04F 13/0825; E04F 13/0875; E04F 13/15; E04F 13/18; G10K 11/168; E04C 2/284
USPC .................................................... 181/290, 284
See application file for complete search history.

(56) References Cited

U.S. PATENT DOCUMENTS 3,367,076 A * 2/1968 O'Brien .................. E04C 2/296
52/309.11
3,822,762 A * 7/1974 Crispin ................... B64C 1/066
181/292
3,948,347 A 4/1976 Rutledge
(Continued)

OTHER PUBLICATIONS

Kinetics Noise Control, Inc.—Ensemble Acoustic Wood Panels—webpage—Feb. 14, 2013.
(Continued)

Primary Examiner — Forrest M Phillips
(74) Attorney, Agent, or Firm — Thomas Coester Intellectual Property

(57) ABSTRACT

A panel for a surface covering system of a plurality of like panels, the panel comprising: a base layer; a first joint extrusion attached along a first edge of the base layer; a second joint extrusion attached along a second edge of the base layer, opposite the first edge; a covering layer covering at least part of the first joint extrusion and at least part of the second joint extrusion; wherein the first extrusion is configured to join to a second extrusion of an adjacent like panel, and the covering layer substantially conceals the first extrusion and the second extrusion when installed.

20 Claims, 9 Drawing Sheets

(51) Int. Cl.
    *E04F 15/20* (2006.01)
    *E04C 2/284* (2006.01)
(52) U.S. Cl.
    CPC ... *E04F 2201/046* (2013.01); *E04F 2290/042* (2013.01)

(56) References Cited

U.S. PATENT DOCUMENTS

| | | | |
|---|---|---|---|
| 4,140,824 A | 2/1979 | Gaillard | |
| 6,613,424 B1 | 9/2003 | Putt | |
| 8,701,825 B2 * | 4/2014 | Yamamoto | E04B 1/8409 181/284 |
| 8,739,924 B2 * | 6/2014 | Johnson | E04B 1/86 181/284 |
| 2011/0173925 A1 | 7/2011 | Brown | |
| 2013/0305648 A1 * | 11/2013 | Spear | E04F 13/0894 52/588.1 |
| 2017/0073976 A1 * | 3/2017 | Nelson | E04F 13/0825 |

OTHER PUBLICATIONS

European search report dated Dec. 21, 2017 regarding application No. 15789259.7-1614 13146124 PCT/AU2015050225.
IPOS Intellectual Property Office of Singapore Written Opinion dated Mar. 19, 2018.

\* cited by examiner

PANEL SYSTEMS AND METHODS

FIELD

The invention relates to panel systems for covering surfaces such as walls, ceilings or the like.

BACKGROUND

Various panel systems are used for covering internal and external wall or ceiling surfaces. The Applicant has proposed various modular systems in Australian Patent Application No. 2008288672. The Applicant has made further developments in modular panel systems.

Reference to any document in this specification does not constitute an admission that such document is prior art, that it is validly combinable with other documents or that it forms part of the common general knowledge.

The present invention may provide an improved panel system, or may at least to provide the public with a useful choice.

SUMMARY

In a first aspect a panel for a surface covering system of a plurality of like panels includes:
a base layer;
a first joint extrusion attached along a first edge of the base layer;
a second joint extrusion attached along a second edge of the base layer, opposite the first edge;
a covering layer covering at least part of the first joint extrusion and at least part of the second joint extrusion;
wherein the first extrusion is configured to join to a second extrusion of an adjacent like panel, and the covering layer substantially conceals the first extrusion and the second extrusion when installed.

In a second aspect an acoustic surface covering system includes a plurality of like panels, each panel including an acoustically absorbent base layer and a perforated covering layer.

In a third aspect a method of forming a panel includes providing a rigid base layer; attaching a first joint extrusion along a first edge of the base layer; attaching a second joint extrusion along a second edge of the base layer, the second edge being opposite the first edge; and attaching a covering layer onto a front surface of the base layer and onto at least part of at least one of the first and second joint extrusions.

The terms "include", "includes", "including", "comprise", "comprises" and "comprising" may, in each jurisdiction, be independently attributed with either an exclusive or an inclusive meaning. For the purpose of this specification, and unless otherwise noted, these terms are all intended to have an inclusive meaning—i.e. they mean an inclusion of the listed components which the use directly references, and possibly also of other non-specified components or elements.

BRIEF DESCRIPTION OF THE DRAWINGS

The invention will now be described by way of example only, with reference to the accompanying drawings, in which.

DETAILED DESCRIPTION

According to a first embodiment a panelling system is provided. The panelling system may be used for ceiling or wall panelling for example. The panelling may provide flexibility in architectural design features for high end domestic or commercial premises. It may allow a wide range of colour and texture finishes, together with high acoustic/fire performance. It may allow for hidden joints and modular installation options.

Figure 1:
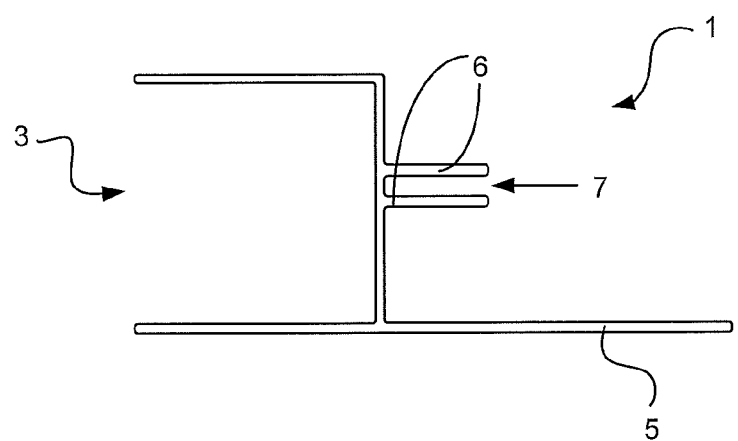
FIG. 1 is a cross-section through a first joint extrusion.
Figure 2:
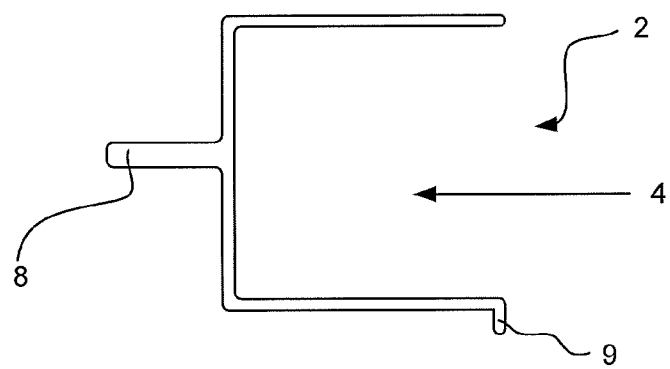
FIG. 2 is a cross-section through a second joint extrusion.
Figure 3:
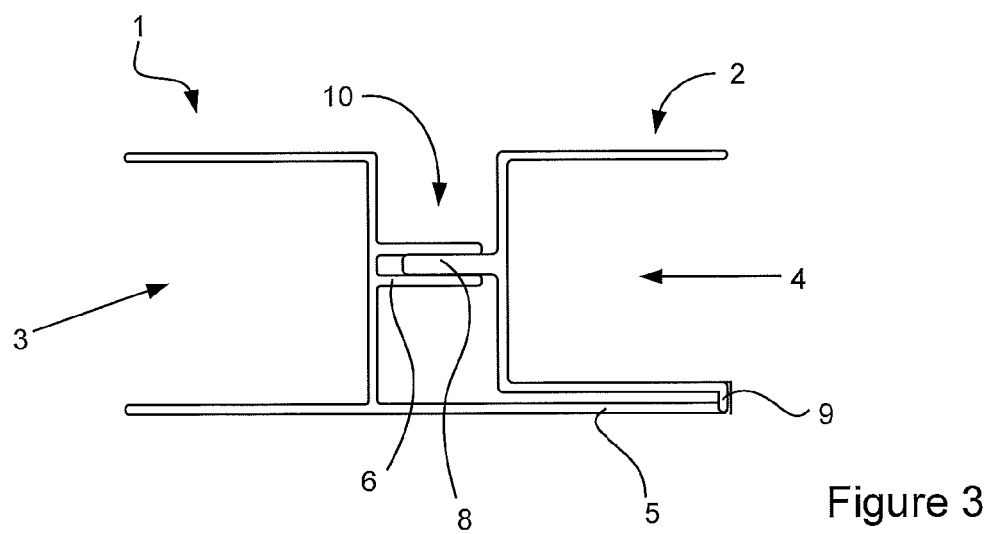
FIG. 3 is a cross-section of the first joint extrusion of FIG. 1 engaged with the second joint extrusion of FIG. 2.

FIGS. 1 and 2 show the system including first and second joint extrusions 1, 2. FIG. 3 shows how the first and second joint extrusions 1, 2 cooperate to form a joint. These extrusions 1, 2 are for the purpose of joining the adjacent panels, similar to a tongue and groove configuration. They may also be used to join pieces of substrate if the required panel length exceeds the standard substrate length. The extrusions also provide rigidity to the panel.

Each of the first and second joint extrusions 1, 2 includes a channel 3, 4 arranged to fit to an edge of a structural base layer, as will be discussed below.

The first joint extrusion 1 includes a base 5, which may be used for attachment of the first joint extrusion to an underlying support or structure, such as a stud, joist, suspended ceiling framing or other available structure.

The first joint extrusion 1 also includes a pair of projections 6, which together form a further channel 7, which receives a projection 8 formed on the second joint extrusion, as shown in FIG. 3.

A lug 9 may be provided on the second joint extrusion 2, and may come to rest against the edge of the base 5, as shown in FIG. 3.

As shown in FIG. 3, the two joint extrusions 1, 2 form a recess 10 when joined.

Figure 4:
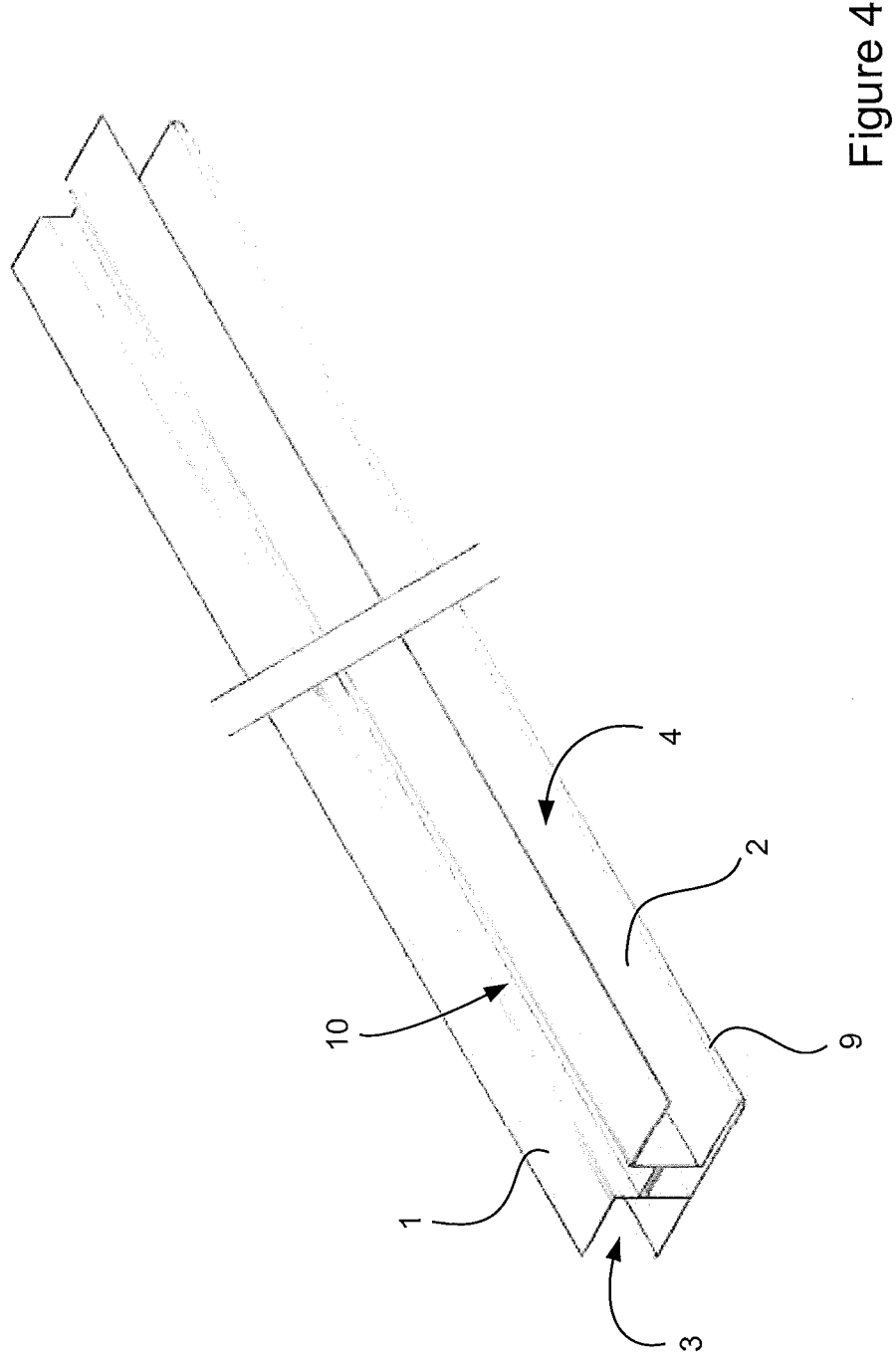
FIG. 4 is a perspective view of the first joint extrusion of FIG. 1 engaged with the second joint extrusion of FIG. 2.

The features of the two joint extrusions illustrated in FIGS. 1 to 3 extend along the lengths of the two extrusions, as shown in FIG. 4. Different extrusions or features may be provided for lengthwise joins, ends or corners.

The extrusions may be formed from aluminium or any other suitable material, including suitable engineering plastics. Alternatively portions may be made of different materials, such as the edge detail made from PVC and the remainder of the extrusion in aluminium.

Figure 5:
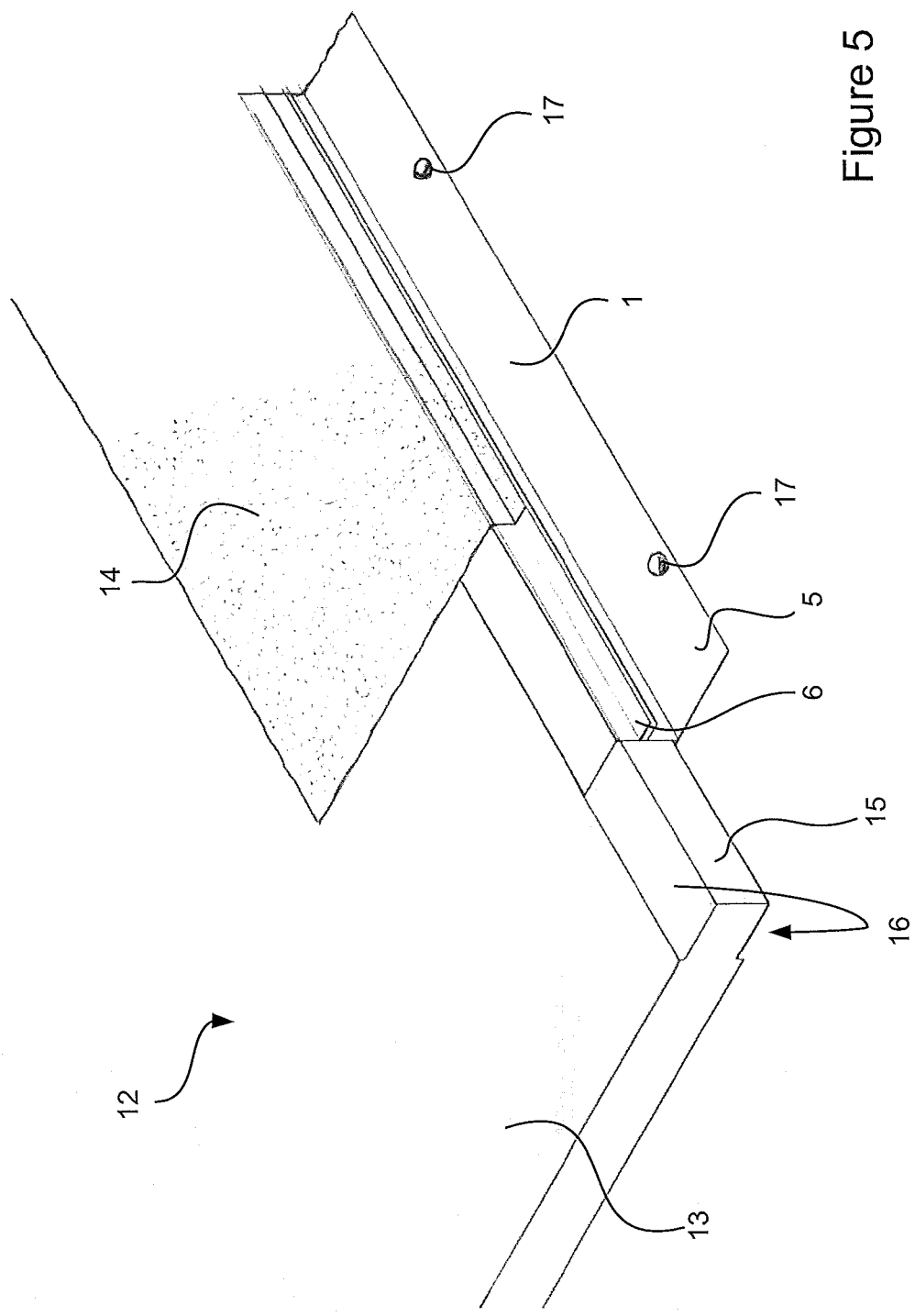
FIG. 5 is a perspective view of a panel according to one embodiment.

FIG. 5 shows a structural base layer 13 or substrate, which may be formed of any suitably rigid materials. For example polyester acoustic board, such as thermally bonded polyester fibre, is an acoustically absorbent material with good fire resistance. For example a two layer composite may be used with a front 5 mm layer of needled and thermally bonded felt and a back 20 mm layer of carded and thermally bonded polyester wadding. The front layer may provide rigidity and the back layer may provide increased acoustic performance. Recycled PET packaging may be used in the manufacture of the polyester fibre.

Alternatively, the base layer may be formed from a fibreglass material, or foam which also have acoustic properties. The Applicant's arrangement is particularly suited to materials that are not able to reliably form integral edge structures (such as tongue and groove).

FIG. 5 also shows a decorative covering layer 14. For illustrative purposes the decorative layer is shown as covering only a portion of the base layer 13, but will in fact cover the base layer entirely in most embodiments. The decorative covering layer may be any suitable veneer (including reconstituted veneer), foil, fabric, leather or plastic (eg: PET, PVC, vinyl, faux leather etc) layer. Veneers may be fleece-backed veneers. The decorative covering layer may be perforated.

FIG. 5 shows the position of the first joint extrusion 1 mounted on a first edge 15 of the panel 12. For illustrative purposes the joint extrusion is not shown extending the full length of the panel. However, in preferred embodiments the joint extrusion 1 will extend the full length of the first edge 15.

The finished panel may include the first and second joint extrusions 1, 2, the base layer 13 and the decorative covering layer 14.

Manufacturing Process

Figure 10:
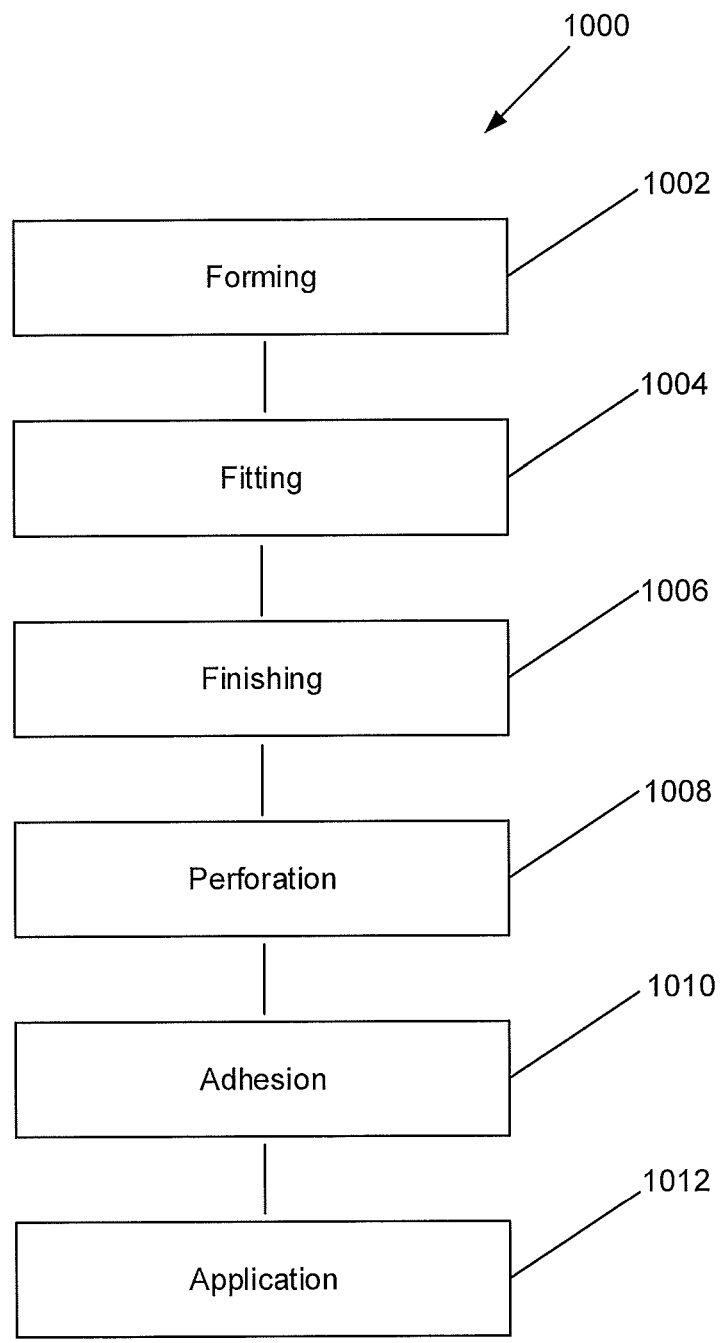
FIG. 10 is a flow diagram of a method of manufacturing.

A manufacturing process 1000 is shown in FIG. 10. A substrate is formed and shaped 1002. The pair of extrusions are fitted 1004 to either side of the substrate. A decorative covering layer has a surface preparation applied 1006. Then the decorative covering layer is perforated 1008 and has an adhesive applied 1010. The adherent decorative covering layer is then edge rolled 1012 to the substrate and extrusions.

Forming 1002 may be implemented by cutting a sheet of polyester fibre into a nominated width. As shown rebates or rabbets 16 may be formed in the back face of base layer for receiving the joint extrusion 1. Holes 17 may be formed in the base 5 of the first joint extrusion 1 for receiving fasteners, to attach the first joint extrusion 1 to an underlying support or structure. The extrusions may be formed by extruding aluminium blanks though a mould piece. The front surfaces of the extrusions may be powder coated depending on aesthetic requirements.

Fitting 1004 may be implemented by forcing the sides of the substrate into the channel in each extrusion. It is also glued in place.

Finishing 1006 may involve applying a lacquer to the decorative covering layer prior to perforation and application. This is so the lacquer, if applied to the finished product, does not change the absorptive properties and affect the acoustic performance by blocking or sealing the polyester/decorative covering layer in the location of the holes.

Perforation 1008 may be done by drilling or punching. If the design requires, a decorative pattern may be employed with the perforations.

Then the decorative covering layer may be laminated to the base layer by any suitable method, using suitable adhesives. The glue is to be applied 1010 to the back of the finish layer only and not the polyester substrate. The main reason for this is that if the glue is applied to the polyester, it would potentially block the absorptive properties of the substrate. In addition to this, after the glue has been applied, the perforations in the finish layer may need to be cleared by compressed air prior to lamination. A polyurethane glue may be used for bonding the decorative covering layer to aluminium and polyester, or other glues may be used depending on the material used for the decorative covering layer.

Application 1012 may be implemented by a profile wrapping machine. The decorative covering layer can include pre-finished veneers, pvc or similar foils, paper, fabric and also metal finishes such as copper, zinc or aluminium. If the decorative covering layer is in roll form, a continuous roll form process may be implemented, where the finishing, perforation and glue application all occur sequentially before the decorative covering layer is roll formed onto the substrate. The manufacturing plant may include rolls of various different surface finishes, which can be quickly interchanged to manufacture panels to order.

When the decorative covering layer is applied to the polyester substrate with the aluminium edge extrusions, it wraps over the face edge of the extrusion and down the sides to where the next panel meets. Accordingly the decorative covering layer should be sufficiently flexible to allow application to the face and edges of the base layer 13 by profile wrapping. Similarly the extrusion may have a rounded leading edge so the veneer or any other more fragile finish will not crack when wrapped down the side or be prone to damage by impact.

The second joint extrusion 2 may be mounted to a second edge opposite the first edge 15 in a similar manner.

As shown, the decorative covering 14 extends over the face of the base layer 13, over part of the first joint extrusion 1 and onto the protrusion 6 of the first joint extrusion 1.

Installation Process

Figure 6:
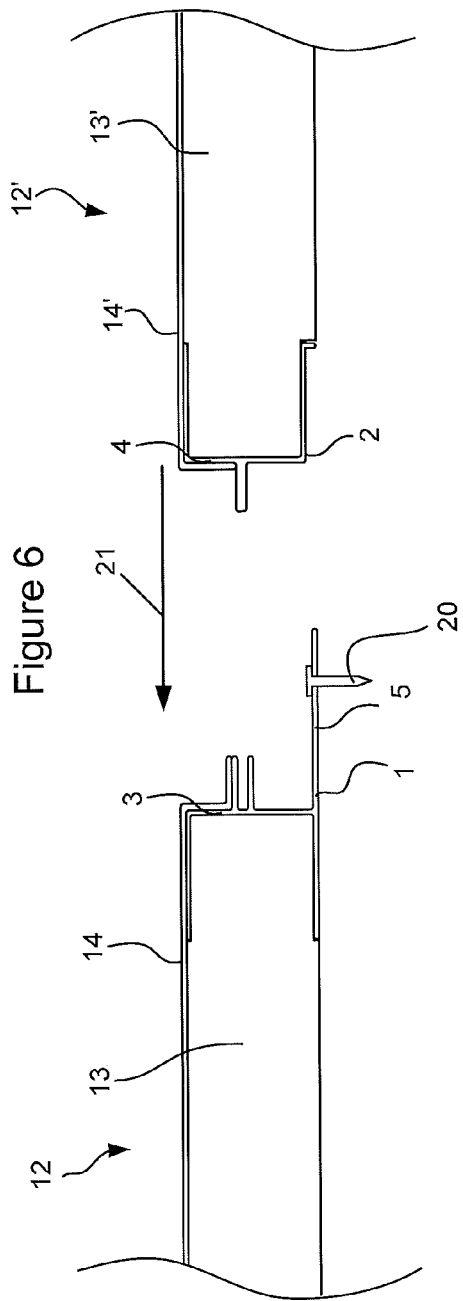
FIG. 6 is a cross-section of first and second panels arranged side by side.

FIG. 6 shows a first panel 12 and a second like panel 12' arranged side by side. This cross-section shows the position of each base layer 13 received in the channel 3, 4 of the first or second joint extrusion 1, 2. This drawing also shows the decorative covering layer 14 extending over part of each joint extrusion 1, 2. FIG. 6 also shows a fastener 20 (e.g. a clout, nail, screw or the like) passing through the base 5 to attach the first joint extrusion 1 to an underlying support or structure (not shown), thereby attaching the first panel 12 to that support or structure.

During installation the first panel 12 will be attached to the underlying support or structure by fastener 20. The second panel can then be positioned by moving it in the direction shown by arrow 21 to bring the second joint extrusion 2 of the second panel 12' into engagement with the first joint extrusion 1 of the first panel 12. The second panel can then be affixed to the underlying support or structure using similar fasteners through the base of its own first joint extrusion 1.

Figure 7:
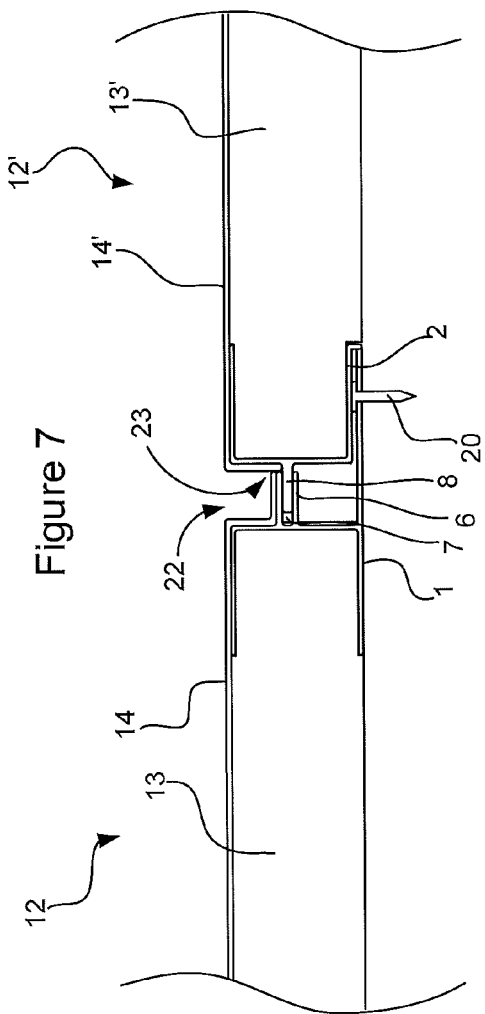
FIG. 7 is a cross-section of the first and second panels of FIG. 6 engaged with each other.

FIG. 7 shows the engaged configuration of the first and second joint extrusions 1, 2. As shown, the projection 8 of the second joint extrusion 2 is received in the channel 7 formed by the two protrusions 6 of the first joint extrusion 1. A recess 22 extends along the join between panels 12, 12'. The meeting 23 between the decorative covering 14 of the first panel 12 and the decorative covering 14' of the second panel 12' also extends along the join and is concealed in the bottom of the recess 22. This creates a clean, disguised join between the panels. In an installed covering system this will create the appearance of a uniform surface covering.

Figure 8:
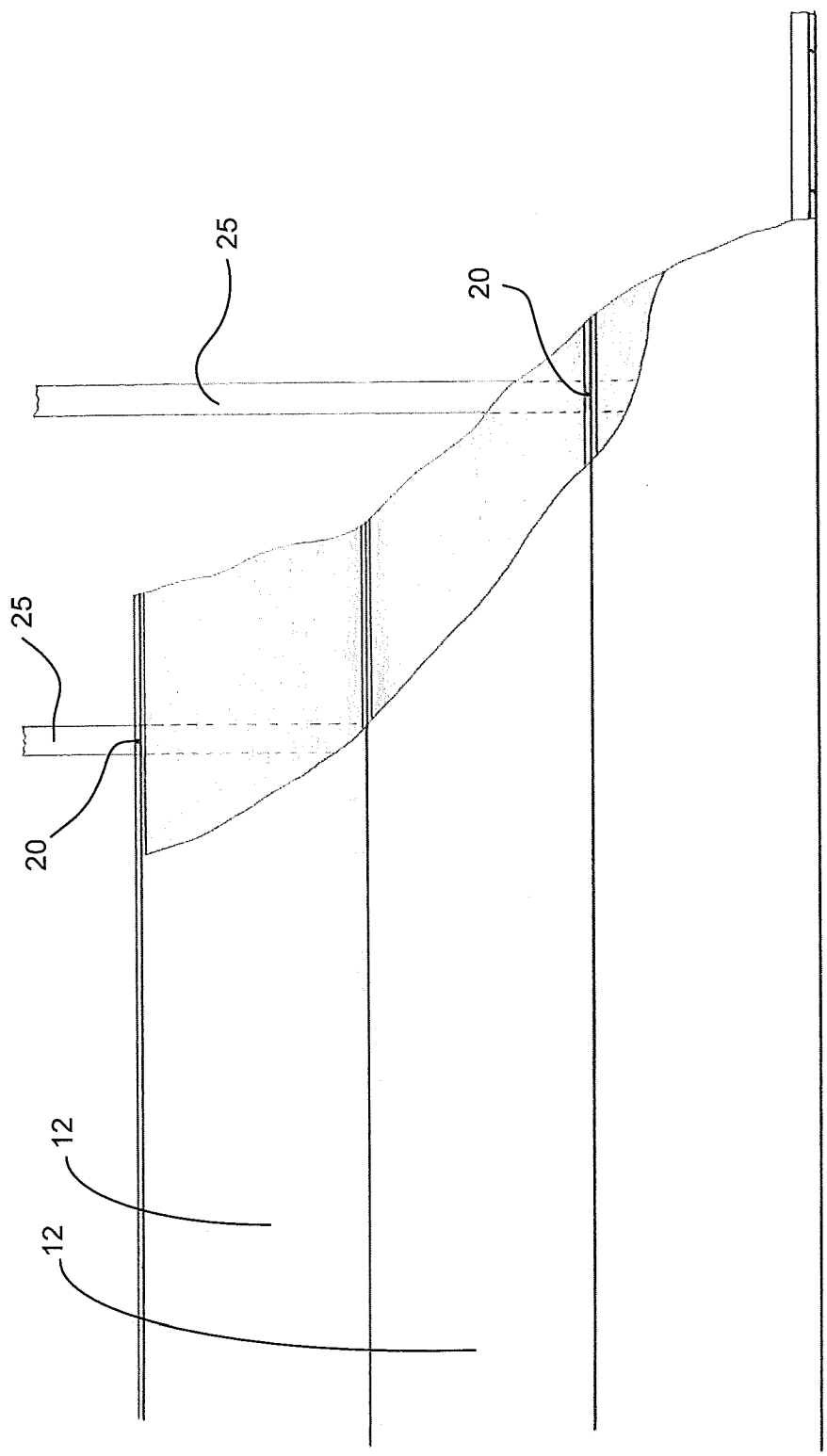
FIG. 8 is a front view of several panels installed on an underlying support or structure.

FIG. 8 show a panels system installed on an underlying support in the form of studs 25. Each panel 12 is attached to the studs by fasteners 20 through the base of the first joint extrusion.

Figure 9:
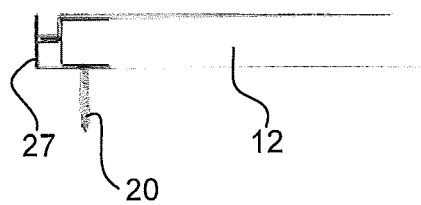
FIG. 9 is a cross-section of a panel engaged with a blank extrusion.

An outer panel may be engaged with a blank extrusion 27 (FIG. 9). The blank extrusion 27 may be attached to the underlying structure by a suitable fastener 20.

Another advantage over any panelling systems is that in a ceiling type application, the extrusion along the opposing edges not only conceals the screwed fixing, but also prevents the edges from sagging and not aligning with each other as well as giving the edge rigidity and protection.

Acoustic Performance

In a preferred embodiment the base layer and covering layer of the panel 12 are formed for acoustic performance. The base layer may be formed from an acoustic material such as polyester fibre, or some other sound absorbing material. The covering layer may be perforated, which enhances the sound absorption and allows sound waves to penetrate to the base layer. In some embodiments the perforations may be less than 2 mm in diameter, preferably around 0.5 to 1 mm in diameter. Circular or non-circular perforations may be used. The base layer may be dark, e.g. black, in colour, for visual appearance through the perforations. The applicant's expectation is that the panel will conform to AS354 2006 for acoustic properties.

The applicant also expects the panel to be classified in Group 1 for BCA Spec C1.10-4 for fire retardant properties.

The panel system may be very lightweight. This may be important in ceiling designs where weight of the panelling system is a constraint.

Figure 11:
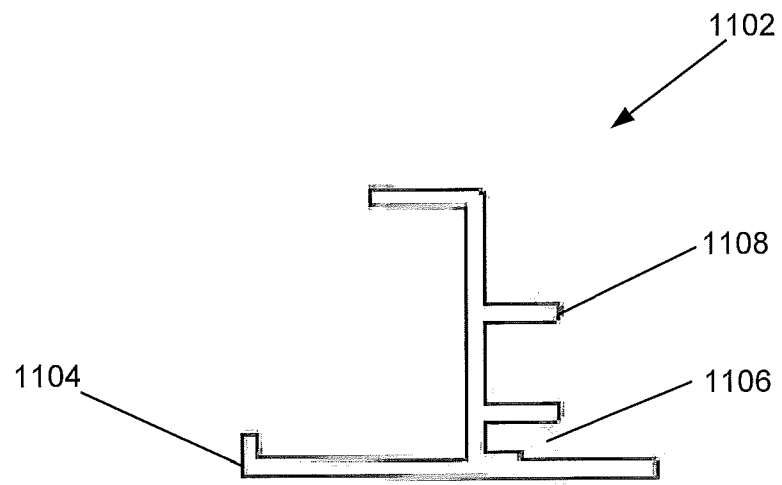
FIG. 11 is a cross-section through a first joint extrusion according to a second embodiment.
Figure 12:
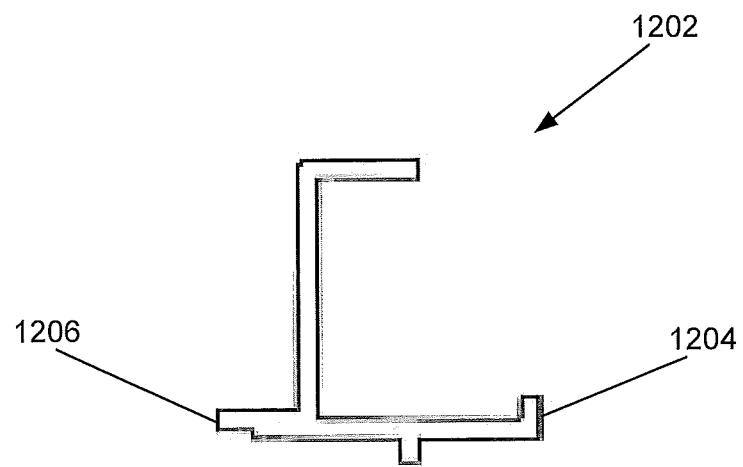
FIG. 12 is a cross-section through a second joint extrusion according to a second embodiment.
Figure 13:
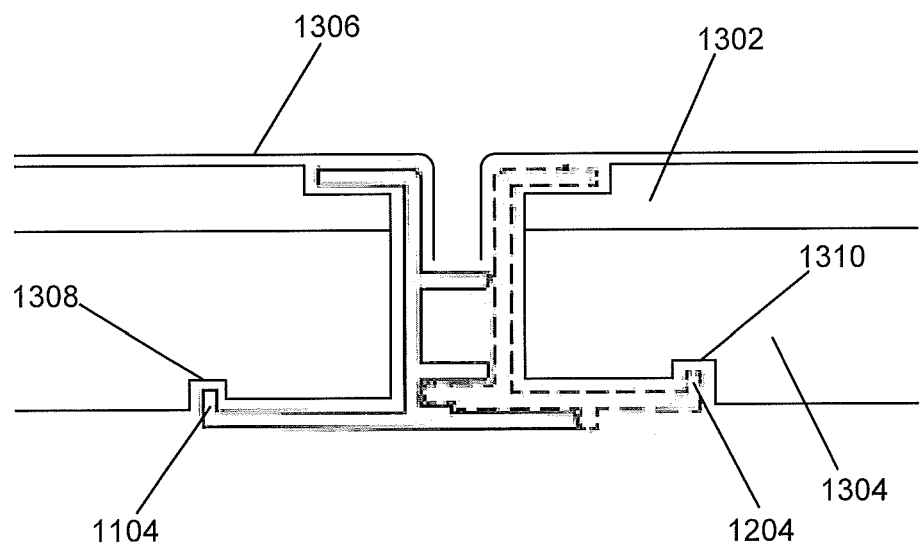
FIG. 13 is a cross-section of the first joint extrusion of FIG. 11 engaged with the second joint extrusion of FIG. 12.

A second embodiment is shown in FIGS. 11 to 13. While the second embodiment is generally similar to the first embodiment, there are several additional features. The first extrusion 1102 and the second extrusion 1202 include inward facing lugs 1104,1204 on each of their base flanges. A channel 1106 is provided for a mating projection 1206 to fit in the tongue and groove manner of the first embodiment.

The first extrusion 1102 may include a further protrusion 1108 to reduce the depth of the recess. This may allow the width of the decorative covering layer to be reduced and it may reduce the amount of powder coating required on the extrusion.

The base layer includes a thicker back layer of polyester fibre 1304 and a thinner front layer of felt 1302. The back layer 1304 includes slots 1308,1310 which mate with the lugs 1104,1204. The combination of the adhesive to the extrusion and the decorative covering layer, and the slots 1308,1310 and lugs 1104,1204 serves to hold the base layer in place. The extrusions also give a strong and rigid support to the corners as well as keeping the panels on the same plane.

In some applications it may be desirable to provide a slot in the top layer 1302 which mates with further lugs in the extrusions. However the top layer is primarily provided for rigidity, and a slot may affect the integrity of the top layer. Also it is desirable that the top of the extrusion is flush with the face of the top layer and the compression associated with a slot may interfere with that. Lastly the decorative covering layer wrapped over the front layer and down the sides of the extrusions will help the extrusion from pulling away from the front layer and may minimise the need for lugs at the front.

In most cases the substrate will be either black, grey or white. For this reason, in the case of perforated panels where the substrate is visible through the perforations, the extrusion can simply be painted/coated to match the substrate. However, if another substrate colour is requested, the front layer can have another layer of fabric applied to the face and colour matched to the extrusion.

While the present invention has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. A panel for a surface covering system of a plurality of like panels, the panel comprising:
   a base layer;
   a first joint extrusion attached to the base layer along a first portion of a perimeter thereof, the first joint extrusion configured to attach to a surface, support or structure;
   a second joint extrusion attached to the base layer along a second portion of the perimeter thereof, opposite the first portion;
   a decorative covering layer covering at least part of the first joint extrusion and at least part of the second joint extrusion;
   wherein the first extrusion is configured to join to a second extrusion of an adjacent like panel, and the decorative covering layer substantially conceals the first extrusion and the second extrusion when installed.

2. A surface covering system comprising a plurality of the panels in claim 1.

3. The system as claimed in claim 2, wherein when a first and second adjacent like panels are installed, the covering layers of the first and second panels are configured to locate within a recess extending along the join between the first and second panels.

4. The system as claimed in claim 2 wherein the base layer is a plastic or fibreglass layer.

5. The system as claimed in claim 2 wherein the covering layer is a veneer, foil, fabric, leather or plastic layer.

6. The system as claimed in claim 5 wherein the covering layer is perforated.

7. The system as claimed in claim 2 wherein the base layer is formed from an acoustically absorbent material.

8. The system as claimed in claim 2 wherein the base layer is formed from polyester fibre.

9. The system as claimed in claim 8 wherein the base layer is formed from a composite of polyester fibre and felt.

10. A system as claimed in claim 9 wherein the polyester fibre includes slots in its back face configured to mate with corresponding lugs in the first extrusion and the second extrusion.

11. An acoustic surface covering system including a plurality of like panels, each panel including an acoustically absorbent base layer and a perforated covering layer.

12. The system as claimed in claim 11 wherein each panel further comprising a rigid structure attached to the base layer.

13. The system as claimed in claim 12 wherein the rigid structure comprises a pair of extrusions of each side, configured to mate adjacent panels.

14. A system as claimed in claim 12 wherein the covering layer is a perforated veneer, foil or plastic layer.

15. A system as claimed in claim 14 wherein the base layer is formed from polyester fibre.

16. The panel in claim 1 further comprising one or more holes in the first joint extrusion for attaching the first joint extrusion to the surface, support or structure.

17. The panel as claimed in claim 1 wherein the first joint extrusion is attached to the base layer around the first portion and/or the second joint extrusion is attached to the base layer around the second portion.

18. A method of forming a panel for a surface covering system, including:
   a) providing a rigid base layer;
   b) attaching a first joint extrusion to the base layer along a first portion of a perimeter thereof;
   c) attaching a second joint extrusion to the base layer along a second portion of the perimeter thereof, the second portion being opposite the first portion; and
   d) attaching a decorative covering layer onto a front surface of the base layer and onto at least part of at least one of the first and second joint extrusions; and
   e) forming one or more holes in a base of the first joint extrusion, for attaching the first joint extrusion to an underlying support or structure.

19. The method as claimed in claim 18 wherein the covering layer is attached to the base layer by profile wrapping.

20. The method as claimed in claim 18 wherein the first joint extrusion is attached to the base layer around the first portion and/or the second joint extrusion is attached to the base layer around the second portion.

* * * * *